(12) United States Patent
Vezzani

(10) Patent No.: US 11,732,057 B2
(45) Date of Patent: Aug. 22, 2023

(54) PROCESS FOR THE OXIDATION OF STARCH-BASED MATERIALS

(71) Applicant: Ambiente E Nutrizione S.R.L., Rozzano (IT)

(72) Inventor: Massimo Vezzani, Rozzano (IT)

(73) Assignee: VOMM IMPIANTI E PROCESSI S.P.A., Rozzano (IT)

(*) Notice: Subject to any disclaimer, the term of this patent is extended or adjusted under 35 U.S.C. 154(b) by 485 days.

(21) Appl. No.: 15/562,490

(22) PCT Filed: Mar. 11, 2016

(86) PCT No.: PCT/EP2016/055231
§ 371 (c)(1),
(2) Date: Sep. 28, 2017

(87) PCT Pub. No.: WO2016/156009
PCT Pub. Date: Oct. 6, 2016

(65) Prior Publication Data
US 2018/0112012 A1    Apr. 26, 2018

(30) Foreign Application Priority Data
Mar. 30, 2015  (IT) .......................... MI2015A000457

(51) Int. Cl.
*C08B 31/18*   (2006.01)
*B01J 19/18*   (2006.01)
*C01B 15/01*   (2006.01)

(52) U.S. Cl.
CPC .......... *C08B 31/18* (2013.01); *B01J 19/1812* (2013.01); *C01B 15/01* (2013.01); *B01J 2204/005* (2013.01); *B01J 2208/00752* (2013.01); *B01J 2208/065* (2013.01); *B01J 2219/00033* (2013.01); *B01J 2219/00085* (2013.01)

(58) Field of Classification Search
CPC ...................................................... C08B 31/18
See application file for complete search history.

(56) References Cited

U.S. PATENT DOCUMENTS

2007/0055058 A1 *  3/2007  Berckmans ............. C08B 31/00
536/104
2016/0046819 A1 *  2/2016  Welsch .................. C08B 30/08
106/163.01

FOREIGN PATENT DOCUMENTS

EP     2386207 A1    11/2011
EP     2620462 A1    7/2013
(Continued)

OTHER PUBLICATIONS

Oxidation of fermented cassava starch using hydrogen peroxide Dias et al Carbohydrate Polymers vol. 86, pp. 185-191 (Year: 2011).*

(Continued)

*Primary Examiner* — Douglas B Call
(74) *Attorney, Agent, or Firm* — Silvia Salvadori, P.C.; Silvia Salvadori

(57) ABSTRACT

A process for the oxidation of powder materials containing starch, which comprises the steps of mixing a powder material comprising starch with an aqueous solution of hydrogen peroxide ($H_2O_2$), adding to the mixture thus obtained an aqueous solution of ammonia which reacts with said mixture and drying the mixture to obtain a powder material containing oxidized starch.

14 Claims, 2 Drawing Sheets

(56) References Cited

FOREIGN PATENT DOCUMENTS

WO      2006105957 A1    10/2006
WO    WO2014167051    * 10/2014

OTHER PUBLICATIONS

Lukasiewicz M., et al., "Environmental friendly polysaccharide modification-microwave-assisted oxidation of starch", Starch-Starke, vol. 63, No. 5, May 17, 2011, pp. 268-273.
Lukasiewicz M., et al., "Low power microwave-assisted enzymatic esterification of starch", Starch-Starke, vol. 64, No. 3, Mar. 14, 2012, pp. 188-197.
Lukasiewicz M., et al., "Microwave-assisted oxidative degradation of starch-estimation of degree of oxidation of the modified polymer", 11th International Electronic Conference of Synthetic Organic Chemistry Nov. 1-30, 2007, pp. 1-6.
Ptaszek A., et al., "Environmental friendly polysaccharide modification-rheological properties of oxidized starches water systems", Starch-Starke vol. 65, No. 1-2, Jan. 19, 2013, pp. 134-145.
Search Report of PCT/EP2016/055231 dated Jun. 9, 2016.

* cited by examiner

PROCESS FOR THE OXIDATION OF STARCH-BASED MATERIALS

This application is a U.S. national stage of PCT/EP206/055231 filed on 11 Mar. 2016, which claims priority to and the benefit of Italian Patent Application No. MI2015A000457 filed on 30 Mar. 2015, the contents of which are all incorporated herein by reference in their entireties.

FIELD OF APPLICATION

The present invention relates to a process for the oxidation of starch-based materials, in particular meal obtained from cereals and starch.

PRIOR ART

Oxidized starch is used in all those industrial sectors which require additives having good film-forming and adhesive properties.

In the food industry oxidized starch is a thickener, use of which is permitted (E-1404) for example in creams, sauces and sweet products, while in the paper industry it is used as an additive for improving the strength of sheets of paper, for improving their printing performance and for improving the retention of cationic additives and as a bonding agent for paper fibres. WO 00/15670 describes the use of oxidized starch as a bonding agent for coatings.

By means of oxidation, the viscosity of the starch in a solution or dispersion is reduced and also the average molecular weight of the starch is reduced.

Oxidation of the starch is conventionally carried out using an alkaline hypochlorite or a peroxide as oxidizing agent.

Oxidation using alkaline hypochlorite is described for example in the application WO 03/018638.

Oxidation using peroxide, for example hydrogen peroxide (oxygenated water), is generally carried out together with a metal catalyst, for example divalent copper, divalent iron or manganese.

Oxidation using hydrogen peroxide and $Cu^{2+}$ is described for example in the application WO 00/15670.

These known processes have the drawback, in the case where an alkaline hypochlorite is used, of the presence of unpleasant odours in the final product and an alkaline metal salt residue and, in the case where a divalent copper or iron compound is used, of a lessening in the whiteness of the starch and the presence of copper and iron salt residues. This makes the oxidized starch obtained unsuitable for use in the alimentary or pharmaceutical sector.

In the light of the aforementioned drawbacks, the problem underlying the present invention is that of providing a process for the production of oxidized starch which does not result in the presence, in the oxidized starch, of unpleasant odours or metal compound residues, which does not cause gelatinization of the starch nor loss of its quaternizing properties and which, in particular, does not involve any of the risks, associated with the currently used reagents, for the health of the operating personnel.

According to another aspect thereof, the present invention relates to a process for the oxidation of starch-based materials consisting of cereal meal.

In this connection, WO 2014/027139 discloses a process for oxidation of starchy fractions of cereals aimed at reducing the gluten content comprising proline, whereby the starchy fraction of cereals is subjected to the action of an oxidizing agent chosen from among hydrogen peroxide, ascorbic acid and titanium oxide, in the presence of a catalyst comprising $Cu^{2+}$ or $Fe^{2+}$.

In this case also there is the drawback of the persistence, in the final product, of metal compounds which alter the colour of the meal and which are undesirable in a product intended for alimentary use by humans or animals.

SUMMARY OF THE INVENTION

The aforementioned problem has been solved, in accordance with the present invention, by a process for the oxidation of materials containing starch, which is carried out in the absence of any metal compounds and which comprises the successive steps of:

a) providing a powder material comprising starch;

b) mixing said material with an aqueous solution of hydrogen peroxide ($H_2O_2$); and c) adding to the mixture thus obtained an aqueous solution of ammonia and reacting it with said mixture.

The final mixture may be finally subjected to a drying step, in order to obtain a powder material containing oxidized starch.

The aforementioned powder material containing starch is selected from the group comprising starch of different origin (for example starch from corn, potato, wheat, tapioca, rice and legumes), meal from cereals, in particular wheat, rice, corn, barley, rye, oats, buckwheat, amaranth and *quinoa*, and meal from legumes, especially beans, peas, chickpeas, broad beans, lentils, lupins, grass peas and soybeans.

The reaction is generally carried out at room temperature, preferably at a temperature of between 15 and 25° C.

The aforementioned aqueous solution of hydrogen peroxide has preferably a w/v concentration comprised between 5% and 20%.

The aforementioned aqueous ammonia solution has preferably a w/v concentration comprised between 5% and 20%.

The weight ratio between the powder material containing starch and the aqueous solution of hydrogen peroxide is generally comprised between 3 and 20.

The weight ratio between the aqueous solution of hydrogen peroxide and the aqueous solution of ammonia is generally comprised between 1 and 10.

The moisture content of the powder material containing oxidized starch obtained at the end of the reaction according to the process of the present invention is preferably brought, by means of the aforementioned drying step, to a value less than or equal to 20%, preferably between 5 and 15% by weight of the total weight of the powder material.

The reaction according to the process of the present invention is preferably carried out inside reactors which allow the powder material containing starch to come into intimate contact with the aqueous solutions of the reagents.

A reactor particularly suitable for carrying out the process according to the present invention consists of a reactor comprising a cylindrical tubular body with horizontal axis, having at least one opening for the introduction of reagents and at least one opening for discharging the final product, an optional heating or cooling jacket for bringing the temperature of said tubular body to a predetermined temperature, and a rotor, arranged in the cylindrical tubular body and comprising a shaft provided with elements projecting radially therefrom.

When such an apparatus is used, according to a first embodiment of the present invention, the process for the oxidation of powder material containing starch comprises the steps of:

a) feeding a continuous flow of powder material containing starch into a first reactor of the type described above, in which the rotor is rotated at a speed greater than or equal to 50 rpm, so as to disperse said continuous flow of powder material containing starch into a flow of particles of said material, b) feeding into said reactor, together with said flow of powder material containing starch, a continuous flow of an aqueous solution of hydrogen peroxide, which is dispersed by the aforementioned rotor into a flow of minute droplets, c) centrifuging said particles and said droplets against the inner wall of said first reactor, with formation of a highly turbulent, dynamic, thin, tubular, fluid layer in which the particles of powder material containing starch and said droplets of aqueous solution of hydrogen peroxide are kept mechanically in intimate contact by the radially projecting elements of said rotor, while advancing in substantial contact with said inner wall of the reactor towards the discharge opening;

d) reacting the powder material containing starch and the hydrogen peroxide in said thin layer while it advances substantially in contact with said inner wall of the turbo-reactor towards the discharge opening;

e) discharging from said discharge opening a continuous flow of a wet powder and feeding said continuous flow into a second reactor of the aforementioned type, in which the rotor is rotated at a speed greater than or equal to 50 rpm;

f) feeding into said second reactor, together with said flow of wet powder, a continuous flow of an aqueous solution of ammonia, which is dispersed by the aforementioned rotor into a flow of minute droplets;

g) centrifuging said continuous flows against the inner wall of said second reactor, through the action of said radially projecting elements of said rotor, causing them to move forwards in substantial contact with said inner wall of said second reactor towards the discharge opening;

h) discharging from said discharge opening a continuous flow of a wet powder comprising oxidized starch;

i) drying said wet powder to a moisture content which is less than or equal to 20% by weight, thereby obtaining a powder material containing oxidized starch.

The temperature of the inner wall of the aforementioned first reactor is preferably kept at room temperature, conveniently at 15-25° C.

The temperature of the inner wall of the aforementioned second reactor is preferably kept at room temperature, conveniently at 15-25° C.

The aforementioned aqueous solution of hydrogen peroxide has preferably a w/v concentration comprised between 5% and 20%.

The aforementioned aqueous solution of ammonia has a w/v concentration comprised between 5% and 20%.

The ratio between the flowrate of the flow of aqueous solution of hydrogen peroxide fed into the first reactor and the flowrate of the flow of powder material containing starch fed into the reactor is preferably comprised between 1:20 and 1:5, conveniently between 1:15 and 1:8.

The ratio between the flowrate of the flow of aqueous solution of ammonia fed into the second reactor and the flowrate of the flow of wet powder material exiting from the first reactor is preferably comprised between 1:20 and 1:5, conveniently between 1:15 and 1:8.

The residence time of the powder material containing starch inside the first reactor is generally comprised between 30 seconds and 20 minutes, depending on the degree of oxidation which is to be obtained, this increasing with the increase in the residence time.

The residence time of the wet powder inside the second reactor is generally comprised between 30 seconds and 5 minutes.

The speed of rotation of the rotor is preferably comprised between 50 and 1500 rpm, advantageously between 150 and 500 rpm.

The aforementioned elements radially projecting from the shaft of the rotor both of the first reactor and the second reactor may be for example in the form of rods, blades, V-blades or beaters.

According to an alternative embodiment, a reactor is used where said reactor comprises a cylindrical tubular body with horizontal axis, provided with a first opening and a second opening for the introduction of reagents, arranged in the vicinity of one end of said cylindrical tubular body, a third opening for the introduction of reagents arranged in a position situated in between said first end of said cylindrical tubular body and the opposite end of said cylindrical tubular body, and at least one opening for discharging the final product, an optional heating or cooling jacket for bringing the temperature of said tubular body to a predetermined temperature, and a rotor, arranged in the cylindrical tubular body and comprising a shaft provided with elements projecting radially therefrom, When this reactor is used, the process for the oxidation of powder material containing starch, comprises the steps of:

a') feeding into a reactor of the type described above a continuous flow of powder material containing starch through said first inlet opening, the rotor being rotated at a speed greater than or equal 50 rpm, so as to disperse said continuous flow of powder material containing starch into a flow of particles of said material, b') feeding into said reactor, through said second inlet opening, a continuous flow of an aqueous solution of hydrogen peroxide, which is dispersed by the aforementioned rotor into a flow of minute droplets, c') centrifuging said particles and said droplets against the inner wall of said reactor, with formation of a highly turbulent, dynamic, thin, tubular, fluid layer in which the particles of powder material containing starch and said droplets of aqueous solution of hydrogen peroxide are kept mechanically in intimate contact by the radially projecting elements of said rotor, while advancing in substantial contact with said inner wall of the reactor toward the discharge opening;

d') causing the powder material containing starch to interact with the hydrogen peroxide in said thin layer while it advances substantially in contact with said inner wall of the reactor towards the discharge opening;

e') feeding into said reactor, through said third inlet opening, a continuous flow of an aqueous solution of ammonia, which is dispersed by the aforementioned rotor into a flow of minute droplets;

f) centrifuging said continuous flows against the inner wall of said reactor, through the action of said radially projecting elements of said rotor, causing them to move forwards in substantial contact with said inner wall of said reactor towards the discharge opening;

g') discharging from said discharge opening a continuous flow of a wet powder comprising oxidized starch;

h') drying said wet powder to a moisture content which is less than or equal to 20% by weight, thereby obtaining a powder material containing oxidized starch.

Preferably the aforementioned third opening is arranged approximately about half way along the length of the aforementioned cylindrical tubular body.

The aforementioned aqueous solution of hydrogen peroxide preferably has a w/v concentration comprised between 5% and 20%.

The aforementioned aqueous solution of ammonia preferably has a w/v concentration comprised between 5% and 20%.

The ratio between the flowrate of the flow of aqueous solution of hydrogen peroxide fed into the reactor and the flowrate of the flow of powder material containing starch fed into the reactor is preferably comprised between 1:20 and 1:5, conveniently between 1:15 and 1:8.

The ratio between the flowrate of the flow of aqueous solution of ammonia fed into the reactor and the flowrate of the flow of powder material containing starch fed into the reactor is preferably comprised between 1:20 and 1:5, conveniently between 1:15 and 1:8.

The residence time of the powder material containing starch inside the reactor is generally comprised between 30 seconds and 20 minutes, depending on the degree of oxidation which is to be obtained, this increasing with an increase in the residence time.

The speed of rotation of the rotor is preferably comprised between 50 and 1500 rpm, advantageously between 150 and 500 rpm.

The aforementioned elements radially projecting from the shaft of the rotor may be for example in the form of rods, blades, V-blades or beaters.

In both the embodiments described above, the reaction comprises a first stage of soaking of the powder material containing starch with the aqueous solution of hydrogen peroxide, followed by reaction of this powder material soaked with hydrogen peroxide with the aqueous solution of ammonia, this decomposing the hydrogen peroxide and activating the oxidation reaction of the starch chains.

Preferably the aforementioned steps i) and h') of drying the wet powder are carried out by means of a turbo-dryer, comprising a cylindrical tubular body with horizontal axis, provided with at least one inlet opening and at least one discharge opening, a heating jacket for bringing the temperature of said tubular body to a predetermined temperature, and a rotor arranged in the cylindrical tubular body and comprising a shaft having elements projecting radially therefrom.

Using this turbo-dryer, the drying steps i) and h') are carried out:

j) feeding said wet powder exiting from said reactor into said turbo-dryer through said at least one inlet opening, the inner wall of the turbo-dryer being kept at a temperature of at least 70° C. by means of said heating jacket and the rotor being rotated at a speed of at least 150 rpm;

l) centrifuging and causing said wet powder to advance inside the turbo-dryer through the action of said rotor; and m) discharging from the outlet opening of the turbo-dryer a continuous flow of powder material containing oxidized starch having a moisture content less than or equal to 20% by weight.

Optionally, simultaneously with the feeding of the aforementioned flow of wet powder into the turbo-dryer according to step j), a flow of gas, preferably air, heated to a temperature of at least 50° C., is also fed into this turbo-dryer, through the aforementioned at least one inlet opening.

The temperature of the inner wall of the turbo-dryer is preferably kept at 70-180° C., conveniently at 130-150° C.

The speed of rotation of the rotor of the turbo-dryer is preferably set to 300-1200 rpm.

The aforementioned elements radially projecting from the shaft of the rotor may be for example in the form of rods, blades, V-blades or beaters.

The temperature of the gas flow fed into the turbo-dryer is preferably between 50° C. and 250° C., conveniently between 120° C. and 150° C.

The residence time of the aforementioned wet powder inside the turbo-dryer is generally comprised between 30 seconds and 20 minutes, depending on the degree of drying of the powder material containing oxidized starch which is to be obtained, this increasing with an increase in the residence time.

According to a further aspect thereof, the present invention relates to a plant for carrying out the process according to the aforementioned first embodiment, which comprises:

a first reactor comprising a cylindrical tubular body with horizontal axis, having at least one opening for the introduction of reagents and at least one opening for discharging the final product, an optional heating or cooling jacket for bringing the temperature of said tubular body to a predetermined temperature, and a rotor, arranged in the cylindrical tubular body and comprising a shaft provided with elements projecting radially therefrom;

a second reactor, comprising a cylindrical tubular body with horizontal axis, having at least one opening for the introduction of reagents and at least one opening for discharging the final product, an optional heating or cooling jacket for bringing the temperature of said tubular body to a predetermined temperature, and a rotor, arranged in the cylindrical tubular body and comprising a shaft provided with elements projecting radially therefrom.

This plant may further comprise a turbo-dryer, comprising a cylindrical tubular body with horizontal axis, having at least one inlet opening and at least one discharge opening, a heating jacket, and a rotor arranged in the cylindrical tubular body and comprising a shaft provided with elements projecting radially therefrom.

Furthermore, the plant may also comprise:

an injector device having a body of tubular shape, provided with an inlet opening, in fluid connection with the at least one discharge opening of the first reactor, and an outlet opening, in fluid connection with the at least one inlet opening of the second reactor, a bladed or screw rotor being supported inside the body of tubular shape.

an injector device having a body of tubular shape, provided with an inlet opening, in fluid connection with the at least one discharge opening of the second reactor, and an outlet opening, in fluid connection with the at least one inlet opening of the turbo-dryer, a bladed or screw rotor being supported inside the body of tubular shape.

According to another aspect, the present invention relates to a plant for carrying out the process according to the aforementioned alternative embodiment, which comprises:

a reactor comprising a cylindrical tubular body with horizontal axis, provided with a first opening and a second opening for the introduction of reagents, arranged in the vicinity of an end of said cylindrical tubular body, a third opening for the introduction of reagents arranged in a position situated in between said first end of said cylindrical tubular body and the opposite end of said cylindrical tubular body, at least one opening for discharging the final product, an optional heating or cooling jacket, and a rotor, arranged in the cylindrical tubular body and comprising a shaft provided with elements projecting radially therefrom.

This plant may further comprise a turbo-dryer as described for the plant for carrying out the process according to the first embodiment.

Furthermore the plant may also comprise an injector device having a body of tubular shape, provided with an inlet opening, in fluid connection with said at least one discharge opening of the reactor, and an outlet opening, in fluid connection with the at least one inlet opening of the turbo-dryer, a bladed or screw rotor being supported inside the body of tubular shape.

According to a further aspect the present invention relates to a powder material containing oxidized starch obtainable from a powder material selected from the group comprising starch from corn, potato, wheat, tapioca, rice and legumes, meal from cereals such as wheat, rice, corn, barley, rye, oats, buckwheat, amaranth and *quinoa*, and meal from legumes such as beans, peas, chickpeas, broad beans, lentils, lupins, grass peas and soybeans, by means of the process described above.

When the powder material containing starch is formed by starch, the product obtained by means of the process according to the present invention is an oxidized starch suitable for all the uses mentioned further above and particularly recommended for alimentary and pharmaceutical use, in view of the fact that the process according to the present invention does not result in the presence of any metal compound residues in the final product. In fact, the excess hydrogen peroxide is deactivated completely by the ammonia and any residual ammonia in the wet powder discharged from the reactor is then completely eliminated during the following drying step.

The oxidized starch obtained by treating starch of any origin using the process according to the present invention is perfectly white and produces aqueous dispersions/solutions with a viscosity decidedly less than that of solutions/dispersions of the starting starch with the same concentration.

When the powder material containing starch used in the process according to the present invention is a cereal meal, for example wheat flour or semolina, with the process according to the present invention it is possible to obtain a meal in which the gluten is completely deactivated and which is therefore suitable also for the preparation of food for persons suffering from coeliac disease or gluten intolerance. In this case also, the meal obtained at the end of the process does not contain metal compound residues and consequently does not have colour alterations and is totally problem-free from an alimentary point of view.

BRIEF DESCRIPTION OF THE DRAWINGS

The advantages and characteristic features of this invention will emerge more clearly from the description below of an example of implementation of the starch cationization process, provided hereinbelow with reference to the apparatus schematically shown in FIGS. 1 and 2 of the attached drawings, provided purely by way of example.

DETAILED DESCRIPTION

Figure 1:
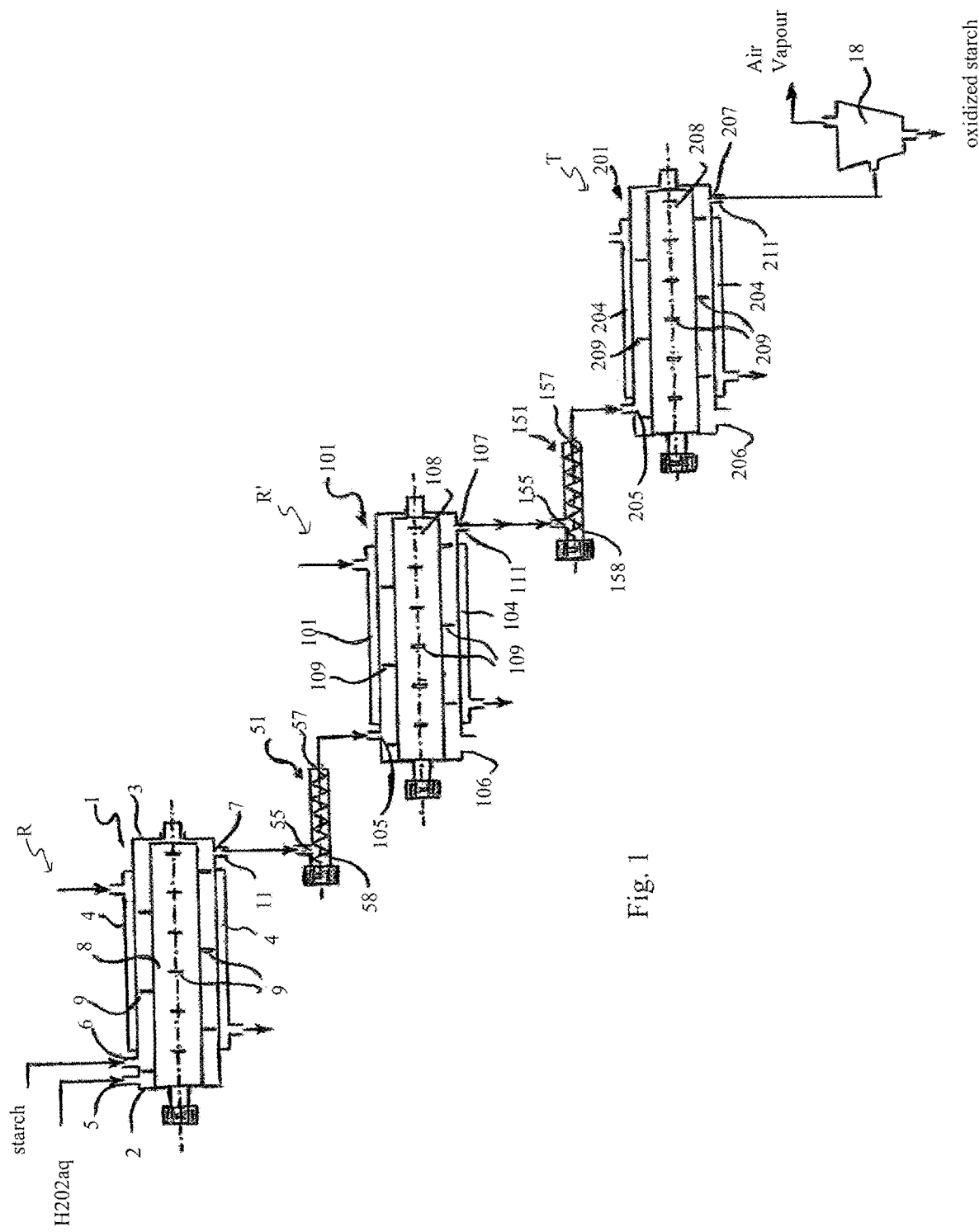

With reference to FIG. 1, an apparatus used for the process according to the invention comprises a reactor R consisting essentially of a cylindrical tubular body 1, closed at the opposite ends by end plates 2, 3 and coaxially provided with a heating (or cooling) jacket 4 intended to be passed through by a fluid, for example diathermic oil, so as to keep the inner wall of the body 1 at a predefined temperature.

The tubular body 1 is provided with inlet openings 5, 6 for the powder material containing starch and the aqueous solution of hydrogen peroxide, respectively, as well as a discharge opening 7.

The tubular body 1 rotatably supports internally a rotor comprising a shaft 8 provided with elements 9 projecting radially therefrom, in the form of blades, these blades 9 being arranged helically and oriented so as to centrifuge and at the same time convey towards the discharge opening 7 the flows of powder material containing starch and aqueous solution of hydrogen peroxide and the wet powder formed following mixing of the powder material with the hydroperoxide solution and its reaction therewith.

A motor M is envisaged for operation of the bladed rotor at variable speeds ranging from 50 to 1500 rpm.

When it exits from the reactor, the aforementioned wet powder is fed via a pipe 11, communicating with the discharge opening 7 of the reactor, to the injector device 51.

The body of the injector device 51 has a tubular shape and is provided with an inlet opening 55 which receives the wet powder from the pipe 11, and an outlet opening 57.

The tubular body 51 rotatably supports internally a bladed or screw rotor 58, which imparts to the wet powder an advancing thrust towards the outlet opening 57, which transfers the wet powder to the inlet opening 105 of a second reactor R'. This second reactor R', which has a structure entirely similar to that of the first reactor described above, is not described in detail. The components of the second reactor which are identical to those of the first reactor are indicated by the same reference numbers increased by 100. It is merely mentioned that the inlet opening 106 is for supplying a flow of aqueous ammonia solution.

The wet powder output from the discharge opening 107 is fed via a pipe 111, communicating with the discharge opening 107 of the second reactor R', to the injector device 151. The components of the injector device 151 which are identical to those of the injector device 51 are indicated by the same reference numbers increased by 100.

Via the outlet opening 157 of the injector device 151, the wet powder is discharged and fed into the turbo-dryer T through the inlet opening 205.

The turbo-dryer T consists essentially of a cylindrical tubular body 201, closed at the opposite ends by end plates 202, 203 and coaxially provided with a heating (or cooling) jacket 204 intended to be passed through by a fluid, for example diathermic oil, so as to keep the inner wall of the body 201 at a predefined temperature.

The tubular body 201 is provided with openings 205, 206 for the introduction of the wet powder discharged by the injector device 151 and hot air, and also with a discharge opening 7.

The tubular body 201 rotatably supports internally a rotor comprising a shaft 108 provided with elements 209 radially projecting therefrom in the form of blades, these blades 209 being arranged helically and oriented so as to centrifuge and at the same time convey towards the outlet 207 the flows of hot air and wet powder. The discharge opening 207 is used to discharge continuous flows of hot air and water vapour and a powder material containing oxidized starch, resulting from drying of the aforementioned wet powder following the heat exchange of the latter with the wall of the turbo-dryer heated by the heating jacket 204 and with the flow of hot air.

The flows of powder material containing oxidized starch and hot air and water vapour are finally conveyed to a container 18 for collecting and separating the vapour and the air also exiting from the turbo-dryer.

Figure 2:
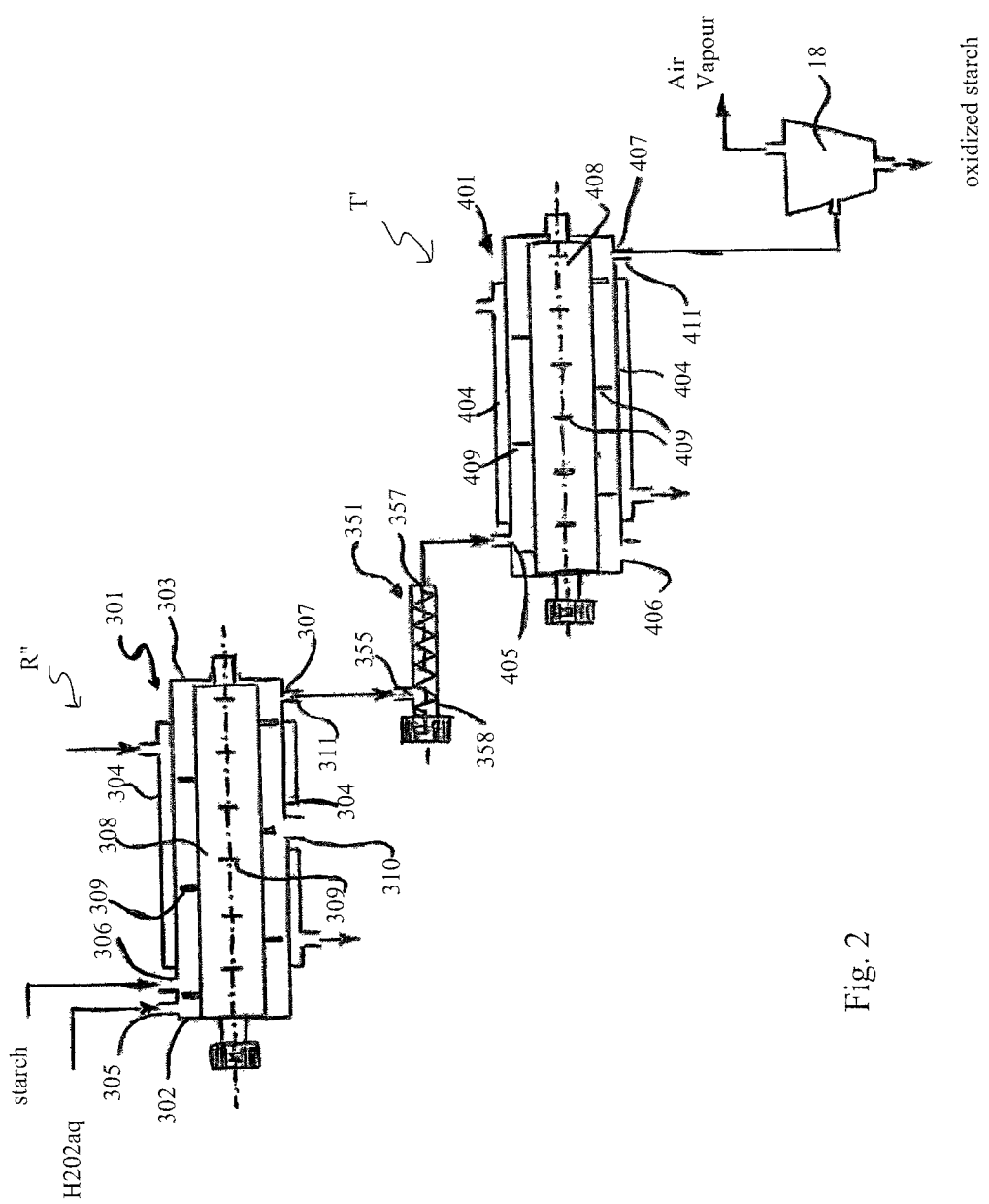

With reference to FIG. 2, an apparatus used for the process according to the invention, in an alternative embodiment thereof, comprises a first reactor R" consisting essentially of a cylindrical tubular body 301, closed at the opposite ends by end plates 302, 303 and coaxially provided with a heating (or cooling) jacket 304 intended to be passed through by a fluid, for example diathermic oil, so as to keep the inner wall of the body 301 at a predefined temperature.

The tubular body 301 is provided with inlet openings 305, 306 for the powder material containing starch and the aqueous solution of hydrogen peroxide, respectively, arranged in the vicinity of the end plate 302, an inlet opening 310 for an aqueous solution of ammonia, arranged along the tubular body 301 in a position approximately equidistant from the end plates 302 and 303, and a discharge opening 307.

The tubular body 301 rotatably supports internally a rotor comprising a shaft 308 provided with elements 309 projecting radially therefrom, in the form of blades, these blades 309 being arranged helically and oriented so as to centrifuge and at the same time convey towards the discharge opening 307 the flows of powder material containing starch, aqueous solution of hydrogen peroxide and aqueous solution of ammonia as well as the wet powder formed following mixing and reaction of the powder material with the hydroperoxide solution and with the ammonia solution.

A motor M is envisaged for operation of the bladed rotor at variable speeds ranging from 50 to 1500 rpm.

When it exits from the reactor, the aforementioned wet powder is fed via a pipe 311, communicating with the discharge opening 307 of the reactor, to the injector device 351.

The body of the injector device 351 has a tubular shape and is provided with an inlet opening 355 which receives the wet powder from the pipe 311, and an outlet opening 357.

The apparatus further comprises a turbo-dryer T' entirely similar to the turbo-dryer T described further above, and therefore not described in detail. The components of this turbo-dryer T' which are identical to those of the turbo-dryer described further above are indicated by the same reference numbers increased by 200.

The apparatus comprises, finally, a container 18 for collecting the powder material containing oxidized starch and separating it from the vapour and the air which are also output from the turbo-dryer.

EXAMPLE 1

A flow of potato starch in powder form with a moisture content of 20% was continuously fed (100 kg/h), through the opening 6, into the reactor R, inside which the bladed rotor 8 was rotated at a speed of 700 rpm. At the same time a flow of aqueous solution of hydrogen peroxide in 36 volumes, corresponding to about 10.9% w/v was continuously fed (10 l/h) through the opening 5.

The temperature of the inner wall was kept at about 20° C.

Immediately at the inlet of the reactor R, the flow of starch was mechanically dispersed into particles which were immediately centrifuged against the inner wall of the reactor, where a dynamic, tubular, thin, fluid layer was formed. At the same time, the aqueous solution of hydrogen peroxide fed through the opening 5 was finely atomized by the blades of the rotor 8 which also performed the immediate centrifuging of the very fine droplets obtained. The latter were thus introduced into the dynamic, tubular, thin, fluid layer of starch particles, with which they were able to interact intimately.

After an average residence time of about 30 seconds inside the reactor, a powder with a moisture content of 28% was continuously discharged from the opening 7.

This wet powder was continuously fed into the reactor R', through the opening 105, by means of the injector 51, with a flowrate of 100 kg/h.

Inside the reactor R' the wall temperature was kept at a value of about 20° C., while the rotational speed of the bladed rotor 108 was kept constantly at 800 rpm.

A continuous flow of an aqueous solution of ammonia (10% w/v) was fed through the opening 106 into the reactor R' (flowrate 10 l/h).

After an average residence of 20 seconds inside the reactor, a wet powder with a moisture content of 35% was continuously discharged from said reactor though the opening 107.

This wet powder was continuously fed into the turbo-dryer T, through the opening 205, by means of the injector 151, with a flowrate of 100 kg/h, in parallel with a flow of air at a temperature of 100° C. (flowrate 500 m$^3$/h), fed through the opening 206.

Inside the turbo-dryer T the wall temperature was kept at a value of 150° C., while the rotational speed of the bladed rotor 108 was kept constantly at 1000 rpm.

After an average residence time of 20 seconds inside the turbo-dryer T, oxidized potato starch in powder form with a moisture content of 10% was continuously discharged from said turbo-dryer.

The viscosity of a 10% aqueous solution of this oxidized starch powder was determined, obtaining a value of 10 cps where the viscosity of a 10% aqueous solution of the starting starch powder was equal to 1450 cps.

The oxidized starch powder was perfectly white and odourless and also devoid of any metal compound residues and therefore perfectly suitable for all the intended uses of oxidized starch, in particular alimentary and pharmaceutical use.

EXAMPLE 2

A flow of corn starch in powder form with a moisture content of 18% was continuously fed (80 kg/h), through the opening 306, into the reactor R", inside which the bladed rotor 308 was rotated at a speed of 800 rpm. At the same time a flow of aqueous solution of hydrogen peroxide in 30 volumes, corresponding to about 9.1% w/v, was continuously fed (10 l/h) through the opening 305 and a continuous flow of aqueous solution of ammonia, 9% w/v, was continuously fed (10 l/h) through the inlet opening 310. The temperature of the inner wall was kept at about 20° C.

After an average residence time of about 30 seconds inside the reactor, a powder with a moisture content of 33% was continuously discharged from the opening 307.

This wet powder was continuously fed into the turbo-dryer T', through the opening 405, by means of the injector 351, with a flowrate of 80 kg/h, in parallel with a flow of air at a temperature of 100° C. (flowrate 400 m$^3$/h), fed through the opening 406.

Inside the turbo-dryer T' the wall temperature was kept at a value of 150° C., while the rotational speed of the bladed rotor 108 was kept constantly at 1000 rpm.

After an average residence time of 20 seconds inside the turbo-dryer T, oxidized corn starch powder with a moisture content of 10% was continuously discharged from said turbo-dryer.

The viscosity of a 10% aqueous solution of this oxidized starch powder was determined, obtaining a value of 11 cps where the viscosity of a 10% aqueous solution of the starting starch powder was equal to 1410 cps.

The oxidized starch powder was perfectly white and odourless and also devoid of any metal compound residues and therefore perfectly suitable for all the intended uses of oxidized starch, in particular alimentary and pharmaceutical use.

EXAMPLE 3

A flow of type O wheat flour starch with a moisture content of 14% was continuously fed (100 kg/h), through the opening 6, into the reactor R, inside which the bladed rotor 8 was rotated at a speed of 900 rpm. At the same time a flow of aqueous solution of hydrogen peroxide in 36 volumes, corresponding to about 10.9% w/v, was continuously fed (10 l/h) through the opening 5. The temperature of the inner wall was kept at about 20° C.

After an average residence time of about 30 seconds inside the reactor, a wet flour with a moisture content of 27% was continuously discharged from the opening 7.

This wet flour was fed continuously into the reactor R', through the opening 105, by means of the injector 51, with a flowrate of 100 kg/h.

Inside the reactor R' the wall temperature was kept at a temperature of about 20° C., while the rotational speed of the bladed rotor 108 was kept constantly at 800 rpm.

A continuous flow of an aqueous solution of ammonia (10% w/v) was fed through the opening 106 into the reactor R' (flowrate 10 l/h).

After an average residence of 20 seconds inside the reactor, a wet flour with a moisture content of 34% was continuously discharged from said reactor though the opening 107.

This wet flour was continuously fed into the turbo-dryer T, through the opening 205, by means of the injector 151, with a flowrate of 100 kg/h, in parallel with a flow of air at a temperature of 100° C. (flowrate 500 m³/h), fed through the opening 206.

Inside the turbo-dryer T the wall temperature was kept at a value of 150° C., while the rotational speed of the bladed rotor 108 was kept constantly at 900 rpm.

After an average residence time of 20 seconds inside the turbo-dryer T, wheat flour containing oxidized starch, with a moisture content of 13%, was continuously discharged from said turbo-dryer.

The flour obtained was white and odourless and also devoid of any metal compound residues and therefore perfectly suitable for human consumption.

The gliadin contact of the flour thus obtained was determined by means of electrophoresis on a polyacrylamide gel (SDS-PAGE), resulting in the substantial absence of gliadin, this showing that the process according to the present invention caused a total degradation of the gliadin contained in the flour.

This flour was therefore particularly suitable for consumption by persons suffering from coeliac disease or gluten intolerance.

The invention claimed is:

1. A process for the oxidation of powder materials containing starch, which is carried out in the absence of any metal compounds and which comprises the successive steps of:
    a) providing a powder material comprising starch;
    b) mixing said powder material with an aqueous solution of hydrogen peroxide ($H_2O_2$) to obtain a mixture; and
    c) adding to the mixture an aqueous solution of ammonia, which is reacted with said mixture to obtain a wet powder material containing oxidized starch,
    wherein step c) is carried out at a temperature of between 15 and 25° C.

2. The process for the oxidation of powder materials containing starch according to claim 1, further comprising drying said wet powder material obtained in step c), to obtain a dry powder material containing oxidized starch.

3. The process for the oxidation of powder materials containing starch according to claim 1, wherein said powder material containing starch is selected from the group comprising starch from corn, potato, wheat, tapioca, rice and legumes, meal from cereals, comprising wheat, rice, corn, barley, rye, oats, buckwheat, amaranth and *quinoa*, and meal from legumes, comprising beans, peas, chickpeas, broad beans, lentils, lupins, grass peas and soybeans.

4. The process for the oxidation of powder materials containing starch according to claim 1, wherein said aqueous solution of hydrogen peroxide has a w/v concentration comprised between 5% and 20%.

5. The process for the oxidation of powder materials containing starch according to claim 1, wherein said aqueous solution of ammonia has a w/v concentration comprised between 5% and 20%.

6. The process for the oxidation of powder materials containing starch according to claim 2, wherein said powder material containing starch and said aqueous solution of hydrogen peroxide have a weight ratio comprised between 3 and 20.

7. The process for the oxidation of powder materials containing starch according to claim 6, wherein said aqueous solution of hydrogen peroxide and said aqueous solution of ammonia have a weight ratio comprised between 1 and 10.

8. The process for the oxidation of powder materials containing starch according to claim 2, wherein said dry powder material containing oxidized starch has a moisture content less than or equal to 20% of the total weight of said wet powder material containing oxidized starch obtained in step c).

9. A process for the oxidation of powder materials containing starch comprising the steps of:
    a) providing a first reactor comprising
        a cylindrical tubular body with horizontal axis, having at least one opening for introducing a powder material containing starch and an aqueous solution of hydrogen peroxide, and at least one discharge opening,
        an optional heating or cooling jacket for bringing said cylindrical tubular body to a predetermined temperature, and
        a rotor, arranged in the cylindrical tubular body and comprising a shaft provided with elements projecting radially therefrom, and feeding a continuous flow of said powder material containing starch into said first reactor, in which the rotor is rotated at a speed greater than or equal to 50 rpm, so as to disperse said continuous flow of said powder material containing starch into a flow of particles of said powder material containing starch, b) feeding into said first reactor, together with said flow of particles of said powder material containing starch, a continuous flow of said aqueous solution of hydrogen peroxide, which is dispersed by said rotor into a flow of droplets of said aqueous solution of hydrogen peroxide, c) centrifuging said flow of particles of said powder material containing starch and said flow of droplets of said aqueous solution of hydrogen peroxide against an inner wall of said first reactor, with formation of a turbulent, dynamic, tubular, fluid layer in which the flow of particles of said powder material containing starch and said flow of droplets of said aqueous solution of hydrogen peroxide are kept mechanically in contact by the radially projecting elements of said rotor, while advancing in contact with said inner wall of the first reactor towards the at least one discharge opening, wherein said inner wall of said first reactor is kept at a temperature of between 15 and 25° C.;

d) reacting the powder material containing starch and the flow of droplets of said aqueous solution of hydrogen peroxide in said fluid layer while it advances in contact with said inner wall of the first reactor towards the at least one discharge opening;

e) discharging from said at least one discharge opening a continuous flow of a wet powder, and feeding said continuous flow of said wet powder into a second reactor comprising
- a cylindrical tubular body with horizontal axis, provided with at least one opening for introducing said continuous flow of said wet powder and an aqueous solution of ammonia, and at least one discharge opening,
- an optional heating or cooling jacket for bringing said cylindrical tubular body to a predetermined temperature, and
- a second rotor, arranged in the cylindrical tubular body and comprising a shaft having elements projecting radially therefrom, the rotor of said second reactor being rotated at a speed greater than or equal to 50 rpm;

f) feeding into said second reactor, together with said continuous flow of said wet powder, a continuous flow of said aqueous solution of ammonia, which is dispersed by said rotor of said second reactor into a flow of droplets of said aqueous solution of ammonia;

g) centrifuging said continuous flows of said wet powder against an inner wall of said second reactor, through the action of said radially projecting elements of said rotor, causing them to move forwards in contact with said inner wall of said second reactor towards the at least one discharge opening of said second reactor, wherein said inner wall of said second reactor is kept at a temperature of between 15 and 25° C.;

h) discharging from said at least one discharge opening of said second reactor a continuous flow of a wet powder comprising oxidized starch; and i) drying said wet powder to reach a moisture content which is less than or equal to 20% of the total weight of said wet powder material obtained in step h), thereby obtaining a dry powder material containing oxidized starch.

10. The process for the oxidation of powder materials containing starch according to claim 9, wherein said elements projecting radially from the shaft of said rotor of said first reactor and from the shaft of said rotor of said second reactor are in the form of rods, blades, V-blades or beaters.

11. The process for the oxidation of powder materials containing starch according to claim 9, wherein said hydrogen peroxide has a w/v concentration comprised between 5% and 20% of said aqueous solution and said ammonia has a w/v concentration comprised between 5% and 20% of said aqueous solution.

12. The process for the oxidation of powder materials containing starch according to claim 9, wherein the flow of aqueous solution of ammonia and the flow of powder material containing starch have a ratio comprised between 1:20 and 1:5.

13. The process for the oxidation of powder materials containing starch according to claim 9, wherein the moisture content of said powder material containing oxidized starch is between 5 and 15% of the total weight of said powder material containing oxidized starch.

14. The process for the oxidation of powder materials containing starch according to claim 8, wherein the moisture content of said powder material containing oxidized starch is between 5% and 15% of the total weight of said powder material containing oxidized starch.

* * * * *